United States Patent
Oda et al.

(10) Patent No.: US 9,757,779 B2
(45) Date of Patent: Sep. 12, 2017

(54) CENTRIFUGALLY CAST COMPOSITE ROLL FOR HOT ROLLING AND ITS PRODUCTION METHOD

(75) Inventors: Nozomu Oda, Kitakyushu (JP);
Yasunori Nozaki, Yasugi (JP); Ryouta Honda, Kitakyushu (JP); Takumi Ohata, Kitakyushu (JP)

(73) Assignee: HITACHI METALS, LTD., Tokyo (JP)

( * ) Notice: Subject to any disclaimer, the term of this patent is extended or adjusted under 35 U.S.C. 154(b) by 52 days.

(21) Appl. No.: 14/344,734

(22) PCT Filed: Sep. 3, 2012

(86) PCT No.: PCT/JP2012/072345
§ 371 (c)(1),
(2), (4) Date: Mar. 13, 2014

(87) PCT Pub. No.: WO2013/042528
PCT Pub. Date: Mar. 28, 2013

(65) Prior Publication Data
US 2014/0345353 A1    Nov. 27, 2014

(30) Foreign Application Priority Data

Sep. 21, 2011   (JP) .................................. 2011-205644
Sep. 21, 2011   (JP) .................................. 2011-205645
(Continued)

(51) Int. Cl.
C21D 9/38      (2006.01)
B21B 27/03     (2006.01)
(Continued)

(52) U.S. Cl.
CPC .............. *B21B 1/26* (2013.01); *B21B 27/032* (2013.01); *B22D 13/02* (2013.01); *B22D 19/16* (2013.01);
(Continued)

(58) Field of Classification Search
CPC .......... C21D 9/38; C21D 9/0068; C21D 5/00; C22C 38/50; C22C 37/10; C22C 38/48;
(Continued)

(56) References Cited

U.S. PATENT DOCUMENTS 2,948,934 A * 8/1960 Coupland, Jr. ...... B22D 13/102
                                                     249/137
3,951,650 A    4/1976 Miyashita
(Continued)

FOREIGN PATENT DOCUMENTS

EP    0 430 241 A1   6/1991
EP    0559899 A1    9/1993
(Continued)

OTHER PUBLICATIONS

International Search Report of PCT/JP2012/072345 dated Oct. 9, 2012.
(Continued)

*Primary Examiner* — James S McClellan
*Assistant Examiner* — Peter Iannuzzi
(74) *Attorney, Agent, or Firm* — Sughrue Mion, PLLC

(57) ABSTRACT

A centrifugally cast composite roll for hot rolling comprising an outer layer having a composition comprising by mass 0.8-3.5% of C, 0.1-2.5% of Si, 0.1-2.5% of Mn, 1.2-15% of Cr, 1-5% of Ni, and 1-10% of Mo+0.5×W, the balance being substantially Fe and inevitable impurities, and an inner layer made of an iron-based alloy and integrally fused to the outer layer; the outer layer having Shore hardness of 67-82 at the initial diameter of the composite roll; and the maximum
(Continued)

Shore hardness of the outer layer in a range 30 mm or more deep from the initial diameter being higher by 1 or more than the Shore hardness of the outer layer at the initial diameter.

13 Claims, 3 Drawing Sheets

(30) Foreign Application Priority Data

| | | | |
|---|---|---|---|
| Jul. 11, 2012 | (JP) | ................................ | 2012-155403 |
| Jul. 11, 2012 | (JP) | ................................ | 2012-155404 |
| Jul. 11, 2012 | (JP) | ................................ | 2015-155402 |

(51) Int. Cl.

| | |
|---|---|
| *B21B 1/26* | (2006.01) |
| *B22D 13/02* | (2006.01) |
| *C22C 38/58* | (2006.01) |
| *C21D 5/00* | (2006.01) |
| *C21D 9/00* | (2006.01) |
| *C22C 37/08* | (2006.01) |
| *C22C 37/10* | (2006.01) |
| *C22C 38/00* | (2006.01) |
| *C22C 38/02* | (2006.01) |
| *C22C 38/04* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *B22D 19/16* | (2006.01) |
| *B32B 15/01* | (2006.01) |
| *B21B 1/22* | (2006.01) |

(52) U.S. Cl.
  CPC .............. *B32B 15/011* (2013.01); *C21D 5/00* (2013.01); *C21D 9/0068* (2013.01); *C21D 9/38* (2013.01); *C22C 37/08* (2013.01); *C22C 37/10* (2013.01); *C22C 38/001* (2013.01); *C22C 38/02* (2013.01); *C22C 38/04* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *B21B 2001/225* (2013.01)

(58) Field of Classification Search
  CPC ......... C22C 38/04; C22C 37/08; C22C 38/46; C22C 38/52; C22C 38/02; C22C 38/44; C22C 38/001; C22C 38/58; B21B 27/00; B21B 1/26; B21B 27/032; B21B 27/02; B21B 27/03; B22D 19/16; B22D 13/02; B32B 15/011

USPC ........ 72/252.5; 492/1, 3, 53, 54, 58; 29/895, 29/895.3, 895.32, 895.33; 148/522
  See application file for complete search history.

(56) References Cited

U.S. PATENT DOCUMENTS

| | | | |
|---|---|---|---|
| 4,433,032 A | | 2/1984 | Nakamura et al. |
| 4,726,417 A | * | 2/1988 | Sano ....................... B21B 27/00 164/461 |
| 5,305,522 A | * | 4/1994 | Nawata ................... B21B 27/00 29/895.32 |
| 5,316,596 A | | 5/1994 | Kataoka |
| 5,355,932 A | * | 10/1994 | Nawata ................... B21B 27/00 164/114 |
| 5,738,734 A | | 4/1998 | Sawa et al. |
| 5,826,322 A | * | 10/1998 | Hugo ................... B22D 13/023 164/114 |
| 6,805,757 B1 | | 10/2004 | Windhager et al. |
| 8,308,622 B2 | | 11/2012 | Furushima et al. |
| 2004/0214030 A1 | | 10/2004 | Windhager et al. |
| 2008/0226936 A1* | | 9/2008 | Furushima .............. B21B 27/00 428/615 |
| 2009/0092852 A1* | | 4/2009 | Furushima .............. B21B 27/03 428/656 |

FOREIGN PATENT DOCUMENTS

| | | | | |
|---|---|---|---|---|
| EP | 0 430 241 B1 | 1/1996 | | |
| EP | 0760398 A1 | 3/1997 | | |
| JP | 58055551 A | 4/1983 | | |
| JP | 62-136523 A | 6/1987 | | |
| JP | 02-258949 A | 10/1990 | | |
| JP | EP 0559899 A1 * | 9/1993 | ............ | B21B 27/00 |
| JP | 05295479 A | 11/1993 | | |
| JP | 05311335 A | 11/1993 | | |
| JP | 06041676 A | 2/1994 | | |
| JP | 06-100946 A | 4/1994 | | |
| JP | 06-145887 A | 5/1994 | | |
| JP | 07-75808 A | 3/1995 | | |
| JP | 08-60289 A | 3/1996 | | |
| JP | 09209073 A | 8/1997 | | |
| JP | 2002220635 A | 8/2002 | | |
| JP | 2004-250764 A | 9/2004 | | |
| JP | 2006152381 A | 6/2006 | | |
| WO | 2007/077637 A1 | 7/2007 | | |

OTHER PUBLICATIONS

Communication dated Mar. 25, 2015 from the European Patent Office in counterpart Application No. 12833289.7.

* cited by examiner

CENTRIFUGALLY CAST COMPOSITE ROLL FOR HOT ROLLING AND ITS PRODUCTION METHOD

CROSS REFERENCE TO RELATED APPLICATIONS

This is a National Stage of International Application No. PCT/JP2012/072345 filed Sep. 3, 2012 (claiming priority based on Japanese Patent Application Nos. 2011-205644 filed Sep. 21, 2011, 2011-205645 filed Sep. 21, 2011, 2012-155402 filed Jul. 11, 2012, 2012-155403 filed Jul. 11, 2012 and 2012-155404 filed Jul. 11, 2012), the contents of which are incorporated herein by reference in their entirety.

FIELD OF THE INVENTION

The present invention relates to a centrifugally cast composite roll for hot rolling having a composite structure comprising an outer layer having excellent wear resistance and an inner layer having excellent toughness, particularly to a centrifugally cast composite roll suitable for the finishing hot-rolling of a thin steel sheet in a hot strip mill, and its production method.

BACKGROUND OF THE INVENTION

A hot strip mill acts to heat a slab as thick as several hundreds of millimeters, which is produced by continuous casting, etc., and then roll it to several to several tens of millimeters in thickness by passing it through pluralities of rolls in a roughing mill and a finishing mill successively. The finishing mill usually comprises 5 to 7 four-roll stands arranged in tandem, and a finishing mill widely used comprises seven stands. In the seven-stand finishing mill, first to third stands are called "upstream stands," and fourth to seventh stands are called "downstream stands."

Because rolls used in the finishing mill should withstand a thermal and mechanical load during rolling, centrifugally cast composite rolls (hereinafter referred to simply as "composite rolls") each having a composite structure comprising an outer layer having excellent wear resistance and an inner layer integrally fused to the outer layer and having excellent toughness are used. However, because damages such as wear, surface roughening, heat cracking, etc. occur on the outer layer surface depending on a thermal and mechanical load during rolling, the composite rolls are taken out of the mill after a predetermined time period of use, to remove (cut off) damages. By damages-removing cutting, the diameter of a composite roll body becomes gradually smaller from the initial diameter to a minimum diameter usable for rolling (discard diameter). A diameter in a range from the initial diameter to the discard diameter is called an effective diameter for rolling (simply "effective diameter").

In the finishing mill, a centrifugally cast composite roll comprising an outer layer made of high-speed steel having excellent wear resistance, and an inner layer metallurgically integral with the outer layer and made of cast iron or cast steel having excellent toughness has conventionally been used. The high-speed steel has excellent wear resistance, because high-hardness carbides such as MC-type V carbides, $M_6C$- and $M_2C$-type Mo carbides and W carbides, and $M_7C_3$- and $M_{23}C_6$-type Cr carbides, etc. are precipitated, and because decrease in the matrix hardness at high temperatures is suppressed by Mo and W. Particularly, because a thick steel sheet is rolled in the upstream stands, with little risk of damaging the outer layer by rolling a folded thin steel sheet as in the downstream stands, composite rolls whose outer layers are made of high-speed steel having good wear resistance are widely used.

Such composite roll is produced at low cost by a centrifugal casting method, which comprises casting a melt for an outer layer into a rotating centrifugal casting mold, solidifying the melt to form the outer layer on an inner surface of the mold, vertically assembling this mold with upper and lower molds to constitute a stationary casting mold, and casting a melt for an inner layer into the stationary casting mold.

JP 2-258949 A discloses a wear-resistant, centrifugally cast composite roll comprising an outer layer having a composition comprising by weight 1-4% of C, 3% or less of Si, 1.5% or less of Mn, 4% or less of Ni, 2-15% of Cr, 8% or less of Mo, 20% or less of W, 2-10% of V, and 5% or less in total of at least one selected from the group consisting of Ti, Zr and Nb, the balance being substantially Fe and inevitable impurities, the value of C %+0.4V % being 6.0 or less, and an inner layer made of cast iron or cast steel. This composite roll is subject to a hardening treatment comprising heating to a temperature equal to or higher than the transformation point of the outer layer (1000-1100° C.) and then cooling at a constant speed, and a tempering treatment at 550° C. The hardening treatment transforms the matrix of the outer layer to a hard structure such as martensite or bainite, providing the outer layer with high hardness. However, because the cooling speed in the hardening treatment becomes lower as getting deeper from the surface in a large composite roll such as a hot-rolling composite roll, the hardness of the outer layer is lower inside than on the surface.

JP 6-145887 A discloses a centrifugally cast composite sleeve roll comprising an outer layer made of a high-speed steel comprising by weight 1.8-3.0% of C, 4.0-8.0% of Cr, 2.0-8.0% of Mo, 2.0-6.0% of W, 4.0-10.0% of V, and 12.0% or less of Co, the balance being substantially Fe, and an inner layer made of spheroidal graphite adamite comprising by weight 1.0-2.0% of C, 1.0-3.0% of Si, 0.2-1.0% of Mn, and 0.3-1.5% of Ni, the balance being substantially Fe. This composite sleeve roll is subject to a hardening treatment from a high temperature of 1000-1200° C. In this composite sleeve roll, the outer layer has substantially constant hardness up to the depth of about 100 mm from the surface.

As described above, in conventional centrifugally cast composite rolls subject to a hardening treatment after casting, the hardness of the outer layers is lower inside than on the surface, or substantially constant to some depth. It has thus been widely appreciated by those skilled in the art that in conventional centrifugally cast composite rolls, the hardness of the outer layers decreases at it gets deeper.

In each of upstream and downstream stands in a seven-stand finishing mill, composite rolls of the same material are used usually. For example, in the upstream stands comprising the first to third stands, it is likely that composite rolls of the initial diameter are used in the foremost first stand in which a thick steel sheet tends to be bit, composite rolls with an effective diameter reduced by damages-removing cutting are used in the second stand, and composite rolls with an effective diameter further reduced by damages-removing cutting are used in the third stand. Thus, composite rolls with effective diameters reduced by damages-removing cutting are transferred from the first stand to the second stand, and then to the third stand.

Composite rolls in the first stand are subject to deep heat cracks by heat shock because it first comes into contact with a high-temperature sheet to be rolled. Because heat cracks cause the surface roughening of a composite roll, resulting in a deteriorated surface quality of a rolled sheet, a large amount of damages-removing cutting is conducted to remove heat cracks. A poorly rolled tip portion of the steel sheet passing through the roughing mill is cut off by the crop shears, to prevent the biting of a steel sheet into the finishing mill and the deterioration of surface quality. However, shear-cutting causes folding and the formation of oxide scales in the tip portion of the steel sheet, damaging composite rolls in the first stand.

Though composite rolls in the second and third stands downstream of the first stand are free from damages due to folding and oxide scales, they are required to have small surface roughness (smooth surfaces) because they are arranged upstream of the fourth to seventh stands. Namely, composite rolls with large effective diameters used in the first stand are required to have resistance to scratches due to folding and oxide scales (surface-roughening resistance), and composite rolls with small effective diameters used in the third stand are required to have smooth surfaces. However, all of these requirements variable depending on its effective diameter would not be able to be met by one composite roll.

OBJECT OF THE INVENTION

Accordingly, an object of the present invention is to provide a centrifugally cast composite roll for hot rolling which comprises an outer layer having strong resistance to heat cracking at a large effective diameter (close to the initial diameter), and strong wear resistance at a small effective diameter (close to the discard diameter), and its production method.

DISCLOSURE OF THE INVENTION

As a result of intensive research to provide an outer layer having higher hardness in a deep portion than in a surface portion, it has been found that (a) when a composite roll comprising an outer layer formed by a centrifugal casting method is cooled in a mold, soft troostite is generated in a surface layer of the outer layer, and a deep portion of the outer layer is slowly cooled in a temperature range near 1,000° C. due to the heat of the cast composite roll per se, resulting in carbides precipitated in the matrix and improved hardenability with hard bainite and martensite formed without troostite unlike the surface portion, so that the outer layer is harder in the deep portion than in the surface portion, though the outer surface still has insufficient hardness as a whole; that (b) when a hardening treatment is conducted after casting, the hardness of the outer layer surface layer is improved, but the hardness of the deep portion of the outer layer is hardly improved, so that the outer layer becomes harder in the surface layer than in the deep portion; and that (c) when a tempering treatment is conducted without a hardening treatment after casting, the hardness of the overall outer layer is drastically improved by the transformation of the retained austenite to bainite and martensite, while keeping the relation that the hardness of the outer layer is higher in the deep portion than in the surface portion, thereby providing a centrifugally cast composite roll having sufficient Shore hardness for high heat-cracking resistance in a portion with a large effective diameter close to the initial diameter, and excellent wear resistance and smooth rolling surface in a portion with small effective diameter close to the discard diameter. The present invention has been completed based on such findings.

Thus, the centrifugally cast composite roll for hot rolling according to the present invention comprises an outer layer having a composition comprising by mass 0.8-3.5% of C, 0.1-2.5% of Si, 0.1-2.5% of Mn, 1.2-15% of Cr, 1-5% of Ni, and 1-10% of Mo+0.5×W, the balance being substantially Fe and inevitable impurities, and inner layer made of an iron-based alloy which is integrally fused to the outer layer; the outer layer having Shore hardness of 67-82 at the initial diameter of the composite roll; and the maximum Shore hardness of the outer layer in a range 30 mm or more deep from the initial diameter being higher by 1 or more than the Shore hardness of the outer layer at the initial diameter.

A regression line of the depth-direction distribution of the Shore hardness of the outer layer in a range up to the depth of 30 mm from the initial diameter preferably has positive inclination A (Hs/mm).

The outer layer preferably further comprises 2-15% by mass of V+Nb. The outer layer preferably further comprises at least one of 1-10% of Co, 0.01-2% of Ti, 0.01-2% of Zr, and 0.001-0.15% of N by mass.

In the above composite roll of the present invention, the inner layer is preferably made of ductile cast iron. An intermediate layer is preferably formed between the outer layer and the inner layer.

An area ratio of undecomposed $M_2C$ carbides is preferably larger than an area ratio of MC carbides and $M_6C$ carbides formed by the decomposition of $M_2C$ carbides at the initial diameter of the outer layer, while the former is smaller than the latter at the discard diameter of the outer layer.

A ratio of (area ratio of undecomposed $M_2C$ carbides)/[(area ratio of undecomposed $M_2C$ carbides)+(area ratio of MC carbides and $M_6C$ carbides formed by the decomposition of $M_2C$ carbides)] is preferably 60% or more at the initial diameter. A ratio of (area ratio of MC carbides and $M_6C$ carbides formed by the decomposition of $M_2C$ carbides)/[(area ratio of undecomposed $M_2C$ carbides)+(area ratio of MC carbides and $M_6C$ carbides formed by the decomposition of $M_2C$ carbides)] is preferably 60% or more at the discard diameter.

A cross section area ratio of the outer layer to the inner layer is preferably 0.25-0.8 at the initial diameter.

The method for producing the above centrifugally cast composite roll for hot rolling comprises the steps of casting a melt for the outer layer into a rotating centrifugal casting mold; casting an iron-based alloy melt for the inner layer into the resultant hollow outer layer during or after its solidification, such that the inner layer is integrally fused to an inner surface of the outer layer by re-melting; cooling the resultant composite roll until the surface temperature of the outer layer becomes 600° C. or lower; and then conducting a tempering treatment at 600° C. or lower one or more times without a heating step to a temperature equal to or higher than the transformation point of the outer layer.

The centrifugal casting mold has a wall preferably as thick as 100-600 mm.

DESCRIPTION OF THE PREFERRED EMBODIMENTS

The embodiments of the present invention will be explained in detail below without intention of restricting the present invention thereto, and proper modifications are possible within a scope of the present invention. Explanations of each embodiment will be applicable to any other embodiments unless otherwise mentioned.

[1] Centrifugally Cast Composite Roll for Hot Rolling

Figure 1:
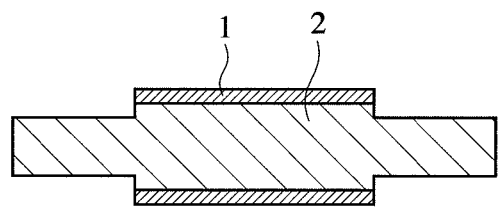
FIG. 1 is a schematic cross-sectional view showing the centrifugally cast composite roll for hot rolling according to the present invention.
Figure 2:
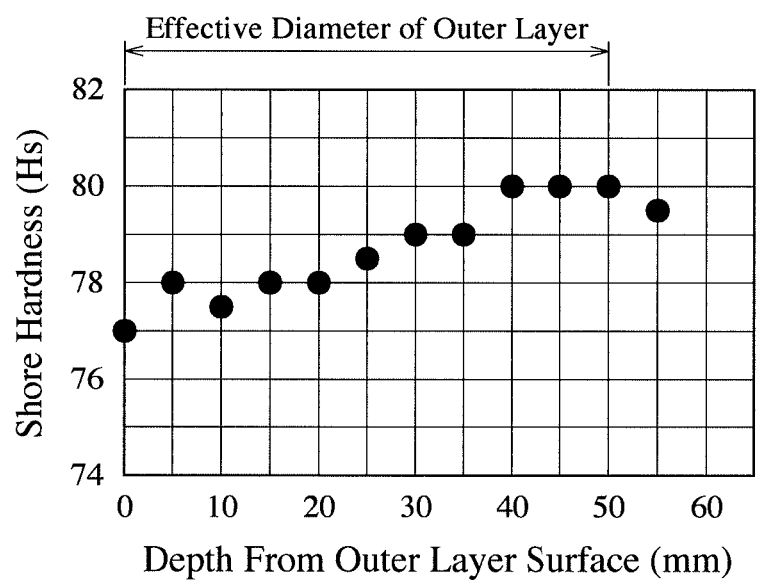
FIG. 2 is a graph showing the hardness distribution of the outer layer in the composite roll of Example 1.

As shown in FIG. 1, the centrifugally cast composite roll for hot rolling according to the present invention comprises an outer layer 1 formed by a centrifugal casting method, and an inner layer 2 integrally fused to an inner surface of the outer layer 1. A preferred outer layer 1 in the present invention has an outer diameter of 200-1300 mm, and a length of 500-3000 mm. The outer diameter of the roll before used for rolling is called "initial diameter," and a range of the roll up to the depth of 10 mm from the initial diameter is called "initial diameter range." The outer diameter most reduced by damages-removing cutting in a usable range is called "discard diameter," and a range of the roll up to 10 mm from the discard diameter toward the outer layer surface is called "discard diameter range."

(A) Outer Layer (1) Composition

To secure wear resistance necessary for use in a finishing mill by the precipitation of hard carbides, the outer layer of the composite roll of the present invention has a composition comprising by mass 0.8-3.5% of C, 0.1-2.5% of Si, 0.1-2.5% of Mn, 1.2-15% of Cr, 1-5% of Ni, and 1-10% of Mo+0.5×W, the balance being substantially Fe and inevitable impurities. The term "%" simply used in explanations below means "% by mass."

(a) C: 0.8-3.5%

C is combined with Cr, Mo, W, V, etc. to form high-hardness carbides ($MC$, $M_2C$, $M_6C$, $M_7C_3$, etc.), functioning to increase the wear resistance of the outer layer. When C is less than 0.8%, too small amounts of carbides are formed, failing to obtain sufficient wear resistance. In addition, the primary crystallization temperature is high, resulting in low castability. On the other hand, when C exceeds 3.5%, a balance with V is not kept, failing to obtain a structure in which VC is uniformly distributed, and thus resulting in poor surface-roughening resistance and toughness. The C content is preferably 1-3%.

(b) Si: 0.1-2.5%

Si is an element necessary for improving the deoxidation and flowability of a melt. Also, it is substituted for expensive elements such as W, Mo, etc. constituting $M_6C$ carbides, contributing to the cost reduction of the outer layer. Less than 0.1% of Si provides a poor deoxidation effect, likely suffering casting defects. On the other hand, when Si exceeds 2.5%, the toughness of the outer layer is deteriorated. The Si content is preferably 0.15-2%.

(c) Mn: 0.1-2.5%

Mn functions as a deoxidizer, and fixes S, an impurity, as MnS. When Mn is less than 0.1%, these effect are poor. On the other hand, when Mn exceeds 2.5%, the retained austenite is likely formed, failing to keep hardness stably. The Mn content is preferably 0.1-2%.

(d) Cr: 1.2-15%

1.2% or more of Cr is necessary as an element for forming carbides. However, when Cr exceeds 15%, Cr carbides are excessively formed. $M_{23}C_6$-type Cr carbides have lower hardness than those of $MC$-, $M_4C_3$-, $M_6C$- and $M_2C$-type Cr carbides, undesirably deteriorating the wear resistance of the outer layer. The Cr content is preferably 3-10%.

(e) Ni: 1-5%

Ni is an element necessary for providing the outer layer with a hardness distribution in which hardness is higher in the discard diameter range than in the initial diameter range. This hardness distribution is effectively obtained when Ni is 1% or more. However, when Ni exceeds 5%, the retained austenite is excessively formed, failing to achieve hardness increase. The Ni content is preferably 1-4%.

The optimum Ni content depends on the initial diameter D (mm) of the composite roll. A roll with a larger initial diameter needs more Ni for improving hardenability because of a lower cooling speed. Insufficient Ni leads to the formation of excessive troostite, resulting in poor hardness. Oppositely, excessive Ni acts to stabilize austenite too much, likely resulting in poor hardness. Accordingly, the Ni content meets the condition of desirably $[(0.00175 \times D)+0.1]\%$ to $[(0.00175 \times D)+1.1]\%$, more desirably $[(0.00175 \times D)+0.3]$ to $[(0.00175 \times D)+0.9]\%$. For example, when the composite roll has an initial diameter of 600 mm, the Ni content is desirably 1.15-2.15%.

(f) Mo+0.5×W: 1-10%

Both Mo and W are combined with C to form hard $M_6C$ carbides and $M_2C$ carbides, and provide the solid solution strengthening of the matrix structure, thereby improving the wear resistance of the outer layer. Because Mo is as effective as 2 times W, it is important that the amount of (Mo+0.5×W) is in a range of 1-10%. Of course, Mo and W may be added alone. Less than 1% of (Mo+0.5×W) fails to provide the above effects, and more than 10% of (Mo+0.5×W) increases $M_6C$ carbides, resulting in poor surface-roughening resistance. (Mo+0.5×W) is preferably 3-10%.

The outer layer of the composite roll of the present invention may contain elements described below, if necessary, in addition to the above elements.

(g) V+Nb: 2-15%

Both V and Nb form MC carbides most contributing to wear resistance, thereby improving the wear resistance of the outer layer. Part of V and Nb are dissolved in $M_2C$ carbides precipitated by solidification, and form MC carbides when the $M_2C$ carbides are decomposed in a temperature range near 1000° C. after the solidification, thereby making coarse $M_2C$ carbides finer, and providing a smooth roll surface. In the formation of the outer layer of the composite roll by a centrifugal casting method, Nb reduces the segregation of MC carbides to some extent. The amount of Nb added may be determined depending on the amount of V added. V+Nb is preferably 2-15%, more preferably 3-10%.

(h) Co: 1-10%

Co, which is an element effective for strengthening the matrix structure, is effective when added in an amount of 1% or more. On the other hand, more than 10% of Co lowers the toughness of the outer layer. The Co content is preferably 1-10%, more preferably 2-7%.

(i) Ti: 0.01-2%

Like V, Ti is combined with C to form MC carbides, thereby improving the wear resistance of the outer layer. Ti oxide formed in the melt acts as crystal nuclei to make the solidified structure finer. Less than 0.01% of Ti makes this effect insufficient, and more than 2% of Ti undesirably forms inclusions. The Ti content is preferably 0.01-2%, more preferably 0.1-0.5%.

(j) Zr: 0.01-2%

Like V, Zr is combined with C to form MC carbides, thereby improving the wear resistance of the outer layer. Zr oxide formed in the melt acts as crystal nuclei to make the solidified structure finer. Less than 0.01% of Zr makes this effect insufficient, and more than 2% of Zr undesirably forms inclusions. The Zr content is preferably 0.01-2%, more preferably 0.1-0.5%.

(k) N: 0.001-0.15%

N stabilizes carbides. When N exceeds 0.15%, defects are likely generated in an interface between the outer layer and the inner layer. The N content is preferably 0.001-0.15%, more preferably 0.01-0.08%.

(m) P and S: 0.1% or Less

Because P and S contained as inevitable impurities deteriorate mechanical properties, their contents should be as small as possible. The amount of each of P and S is preferably 0.1% or less.

(2) Shore Hardness

The outer layer has Shore hardness of 67-82 at the initial diameter, the maximum Shore hardness of the outer layer in a range 30 mm or more deep from the initial diameter being higher than the Shore hardness of the outer layer at the initial diameter by 1 or more. Contrary to rolls subjected to a conventional hardening treatment (hardness decreases as getting deeper), the composite roll of the present invention has wear resistance increasing as getting deeper. Accordingly, the outer layer has high heat-cracking resistance in the initial diameter range, and high wear resistance in the discard diameter range.

When the outer layer has Shore hardness of less than 67 at the initial diameter, the overall outer layer has insufficient wear resistance. The Shore hardness of the outer layer at the initial diameter is preferably 70 or more. On the other hand, when the Shore hardness at the initial diameter is more than 82, the deep portion of the outer layer is too hard, resulting in deteriorated cracking resistance. The preferred Shore hardness of the outer layer at the initial diameter is 70-80.

Because the maximum Shore hardness of the outer layer in the range 30 mm or more deep from the initial diameter is higher than the Shore hardness of the outer layer at the initial diameter by 1 or more, the deep portion (on the side of the discard diameter range) has higher wear resistance. As a result, even when the composite roll having a diameter reduced by damages-removing cutting is rotated faster, increase in wear per the same rolling can be prevented. The Shore hardness difference is preferably 2 or more, more preferably 3 or more.

With respect to the outer layer up to the depth of 30 mm from the initial diameter, a regression line of the depth-direction distribution of Shore hardness Hs preferably has positive inclination A (Hs/mm). Accordingly, the Shore hardness of the outer layer tends to gradually increase from the surface toward inside, a large-effective-diameter portion near the initial diameter having high heat-cracking resistance, and a small-effective-diameter portion near the discard diameter having high wear resistance. As the outer diameter of the composite roll gradually decreases by damages-removing cutting, the composite roll can change from heat-cracking-resistant one suitable for upstream finishing stands in a hot strip mill to wear-resistant one suitable for downstream finishing stands. The inclination A of the regression line of the depth-direction Shore hardness distribution of the outer layer is more preferably 0.03 or more, most preferably 0.05 or more. Incidentally, the regression line is determined by regression analysis from Shore hardness Hs data measured with intervals of 5 mm in a range up to the depth of 30 mm from the initial diameter, and depth data (mm) at which each Hs is measured.

(3) Structure

An area ratio of undecomposed $M_2C$ carbides is larger than an area ratio of MC carbides and $M_6C$ carbides formed by the decomposition of $M_2C$ carbides at the initial diameter of the outer layer, while the area ratio of undecomposed $M_2C$ carbides is smaller than the area ratio of MC carbides and $M_6C$ carbides formed by the decomposition of $M_2C$ carbides at the discard diameter of the outer layer. Accordingly, the undecomposed planar $M_2C$ carbides (relatively coarse, as large as about 20 µm or more in length) at the initial diameter can prevent scratches by folding, oxide scales, etc., which may occur in the composite roll in the first stand, and fine MC and $M_6C$ carbides at the discard diameter can provide a smooth surface necessary for the composite roll in the third stand.

To prevent scratches by folding, oxide scales, etc., a ratio of (area ratio of undecomposed $M_2C$ carbides)/[(area ratio of undecomposed $M_2C$ carbides)+(area ratio of MC carbides and $M_6C$ carbides formed by the decomposition of $M_2C$ carbides)] is preferably 60% or more at the initial diameter. Similarly, an area ratio of $M_2C$ carbides per the entire outer layer structure is preferably 1% or more at the initial diameter.

To obtain a smooth roll surface necessary for the third stand, a ratio of (area ratio of MC carbides and $M_6C$ carbides formed by the decomposition of $M_2C$ carbides)/[(area ratio of undecomposed $M_2C$ carbides)+(area ratio of MC carbides and $M_6C$ carbides formed by the decomposition of $M_2C$ carbides)] is preferably 60% or more at the discard diameter. Similarly, an area ratio of MC carbides and $M_6C$ carbides per the entire outer layer structure is preferably 1% or more at the discard diameter.

Although other carbides such as $M_7C_3$ carbides, $M_{23}C_6$ carbides, etc. than $M_2C$ carbides, MC carbides and $M_6C$ carbides may be precipitated, these carbides do not affect the function of $M_2C$ carbides, MC carbides and $M_6C$ carbides.

In the metal structure of the outer layer, troostite at the initial diameter is more preferably 1-20% by area, and troostite in a range 30 mm or more deep from the initial diameter is less than 10% by area and smaller than the area % at the initial diameter. This secures the effect of the present invention that the outer layer is so soft as to prevent heat cracking in a surface portion, and has high hardness and excellent wear resistance in a deep portion.

(B) Inner Layer

The inner layer in the composite roll of the present invention is preferably made of high-toughness cast iron or cast steel, particularly tough, ductile cast iron. The preferred composition of the tough, ductile cast iron comprises by mass 2.5-4% of C, 1.5-3.1% of Si, 0.2-1% of Mn, 0.4-5% of Ni, 0.01-1.5% of Cr, 0.1-1% of Mo, 0.02-0.08% of Mg, 0.1% or less of P, and 0.1% or less of S, the balance being substantially Fe and inevitable impurities. The use of the ductile cast iron for the inner layer can prevent the breakage of the composite roll by a rolling load in the finishing stands. Of course, the fusion of the outer layer to the inner layer may transfer part of components in the outer layer into the inner layer.

(C) Intermediate Layer

In the composite roll of the present invention, an intermediate layer may be formed between the outer layer and the inner layer to suppress and reduce the transfer of components therebetween. Cast iron with smaller amounts of alloying elements than in the outer layer, adamite, etc. are suitable for the intermediate layer. Such intermediate layer prevents graphitization-preventing elements in the outer layer from melting into the inner layer, when the cast inner layer is fused to the outer layer. To surely prevent the mixing of components in the outer layer into the inner layer, the intermediate layer is preferably as thick as 5-50 mm. The intermediate layer is formed by centrifugally casting an intermediate layer melt cast in the outer layer, during or after solidifying the outer layer melt in the rotating centrifugal casting mold.

(D) Layer Structure

A cross section area ratio of the outer layer to the inner layer is preferably 0.25-0.8 at the initial diameter. When the cross section area ratio of the outer layer to the inner layer is less than 0.25 at the initial diameter, the outer layer is too thin relative to the inner layer, so that the temperature of the overall outer layer is sufficiently elevated by heat of the cast inner layer. This is substantially the same as hardening at 1000° C. On the other hand, when the cross section area ratio of the outer layer to the inner layer exceeds 0.8 at the initial diameter, the inner layer is too small relative to the outer layer, so that carbides may be insufficiently precipitated in the outer layer by the casting of the inner layer. The cross section area ratio of the outer layer to the inner layer is more preferably 0.3-0.6 at the initial diameter. Incidentally, in an as-cast composite roll, the cross section area ratio of the outer layer to the inner layer is preferably 0.35-0.9.

[2] Production Method

The method for producing a centrifugally cast composite roll for hot rolling according to the present invention comprises the steps of casting a melt for the outer layer into a rotating centrifugal casting mold; casting an iron-based alloy melt for the inner layer into the resultant hollow outer layer during or after the solidification of the outer layer, such that the inner layer is integrally fused to an inner surface of the outer layer by re-melting; cooling the resultant composite roll until the surface temperature of the outer layer becomes 600° C. or lower; and then conducting a tempering treatment at 600° C. or lower one or more times without a heating step to a temperature equal to or higher than the transformation point of the outer layer at which the reverse transformation to austenite occurs. In the outer layer composition of the present invention, the transformation point of the outer layer, at which the reverse transformation to austenite occurs, is 700-850° C.

Because of cooling in the centrifugal casting mold after casting, a surface layer of the outer layer is relatively rapidly cooled so that a structure comprising soft pearlite and troostite tends to appear. Also, an inner portion of the outer layer is slowly cooled near 1,000° C. by heat of the cast composite roll, so that oversaturated carbides are precipitated in the matrix, and that the transformation characteristics (hardenability) of the matrix are changed to suppress the generation of pearlite and troostite, resulting in a hard martensite and bainite structure. Accordingly, the large-effective-diameter portion close to the initial diameter has high heat-cracking resistance, while the small-effective-diameter portion close to the discard diameter has high wear resistance. To make sure that carbides are precipitated during solidification after casting, it is preferable that the temperature of the outer layer at the discard diameter is in a range from 900° C. to the melting point, and that such temperature is kept for 30 minutes to 10 hours.

In the as-cast composite roll, the outer layer surface having relatively low Shore hardness cannot be used for hot rolling. However, when a tempering treatment at 600° C. or lower is conducted one or more times without a heating step to a temperature equal to or higher than the transformation point of the outer layer, after the cooling of the cast composite roll until the surface temperature of the outer layer becomes 600° C. or lower, the retained austenite is transformed to martensite and bainite, so that the Shore hardness of the outer layer is extremely increased, and that the outer layer is provided with improved toughness by the tempering of martensite and bainite formed by cooling, resulting in high heat-cracking resistance.

However, when a hardening treatment is conducted after casting, the overall outer layer is uniformly kept at a hardening temperature, and then cooled by air, mist, etc., resulting in a lower cooling speed as it gets deeper in the roll. Accordingly, a deeper portion of the outer layer is more slowly cooled. As a result, solid-soluble elements are homogeneously dissolved in the matrix structure with carbides precipitated from the matrix structure on the outer layer surface side, resulting in higher Shore hardness. On the other hand, such hardening hardly occurs inside the outer layer, resulting in little increased Shore hardness. Therefore, the hardness of the outer layer is highest on the surface and decreases as it gets deeper. In view of the above, it is important in the present invention that the tempering treatment is conducted directly after casting without a hardening treatment.

To cool the surface of the composite roll fast, and the inner portion of the composite roll slowly near 1,000° C., the wall thickness of the centrifugal casting mold is preferably 100-600 mm, more preferably 100-450 mm. The centrifugal casting mold may be horizontal, inclined or vertical. A material for the centrifugal casting mold is preferably ductile cast iron, and an inner surface of the mold is desirably coated with a facing material to a thickness of 1-5 mm. The facing material is desirably based on oxides such as silica, alumina, magnesia, zircon, etc.

The present invention will be explained in more detail referring to Examples below without intention of restricting the present invention thereto.

Examples 1-7, and Comparative Examples 1-3

A centrifugal casting mold of 848 mm in inner diameter, 2700 mm in length and 276 mm in thickness made of ductile cast iron, whose inner surface was coated with a zircon-based facing material as thick as 3 mm, was rotated at such a speed as to provide a centrifugal force of 120 G, and each melt for the outer layer having the composition (% by mass) shown in Table 1 was cast into this centrifugal casting mold and solidified. Each of the resultant outer layers had an average casting thickness of 96.5 mm. A centrifugal casting mold containing each outer layer was vertically assembled with other upper and lower molds to constitute a stationary casting mold. A ductile-cast-iron melt for an inner layer having a composition comprising by mass 3.0% of C, 2.6% of Si, 0.3% of Mn, 1.4% of Ni, 0.1% of Cr, 0.2% of Mo, 0.05% of Mg, 0.03% of P, and 0.03% of S, the balance being substantially Fe and inevitable impurities, was cast at 1431° C. into a cavity (inside the outer layer and space in the upper and lower molds) of the stationary casting mold. An inner surface layer of the outer layer was re-molten, so that the inner layer and the outer layer were integrally fused to each other. Each of the resultant composite rolls was cooled until the surface temperature of the outer layer became 600° C. or lower, and the mold was disassembled. In the resultant composite roll, the inner layer had an average diameter of 655 mm.

TABLE 1

| No.(1) | Composition (% by mass) | | | | | | |
|---|---|---|---|---|---|---|---|
| | C | Si | Mn | Cr | Ni | Mo | W |
| Example 1 | 1.30 | 0.75 | 0.42 | 3.82 | 2.90 | 3.10 | — |
| Example 2 | 2.08 | 0.25 | 0.26 | 4.60 | 2.11 | 8.85 | — |
| Example 3 | 1.81 | 0.82 | 0.81 | 8.25 | 1.79 | — | 5.06 |
| Example 4 | 2.90 | 0.15 | 0.15 | 5.58 | 3.50 | 6.01 | 8.04 |
| Example 5 | 1.82 | 0.90 | 0.52 | 2.74 | 1.83 | 5.53 | 1.72 |
| Example 6 | 1.99 | 1.00 | 0.55 | 6.20 | 2.60 | 7.11 | 0.30 |
| Example 7 | 1.34 | 0.79 | 1.02 | 10.28 | 1.53 | 2.61 | — |
| Com. Ex. 1 | 1.71 | 0.65 | 0.35 | 3.23 | 0.29 | 3.81 | 0.55 |
| Com. Ex. 2 | 2.05 | 0.26 | 0.28 | 4.63 | 2.15 | 8.80 | — |
| Com. Ex. 3 | 1.50 | 2.00 | 1.77 | 2.30 | 2.40 | 5.05 | — |

| No.(1) | Composition (% by mass) | | | | | | |
|---|---|---|---|---|---|---|---|
| | V | Nb | Co | Ti | Zr | N | Fe |
| Example 1 | 3.11 | 0.21 | — | — | — | 0.02 | Bal. |
| Example 2 | 6.22 | — | — | 0.20 | — | 0.04 | Bal. |
| Example 3 | 4.88 | — | — | — | — | 0.03 | Bal. |
| Example 4 | 6.50 | 1.83 | 6.01 | — | 0.35 | 0.05 | Bal. |
| Example 5 | 5.20 | 1.00 | 1.81 | 1.54 | 0.11 | 0.03 | Bal. |
| Example 6 | 5.81 | — | — | — | — | 0.04 | Bal. |
| Example 7 | 0.36 | — | — | — | — | 0.02 | Bal. |
| Com. Ex. 1 | 6.52 | 0.72 | — | — | — | 0.07 | Bal. |
| Com. Ex. 2 | 6.31 | — | — | 0.21 | — | 0.04 | Bal. |
| Com. Ex. 3 | 2.00 | 0.31 | — | — | — | 0.05 | Bal. |

Note:
(1)"Com. Ex." means Comparative Example.

The surface hardness (Shore hardness) Ha of the outer layer of each composite roll was measured by a Shore hardness meter. After successively machining the outer layer with intervals of 5 mm to the depth of 30-50 mm, a working-hardened portion was removed by electropolishing, and the hardness of the exposed outer layer was measured by a Shore hardness meter. The maximum Shore hardness measured was defined as deep-portion hardness Hb. The surface hardness Ha, the deep-portion hardness Hb, the difference (Hb−Ha) between the surface hardness Ha and the deep-portion hardness Hb, and the inclination A of hardness are shown in Table 2. The inclination A of hardness was the inclination (Hs/mm) of the regression line of the depth-direction Shore hardness distribution in a range from the initial diameter of the outer layer to the depth of 30 mm.

FIG. 1 shows the depth-direction Shore hardness distribution of the outer layer of the composite roll of Example 1. The surface hardness Ha was 77, the deep-portion hardness Hb was 80, and the hardness difference (Ha−Hb) was 3. The inclination A of hardness (Hs/mm) was 0.054. When it got deeper than the effective diameter of 50 mm, the Shore hardness decreased slightly, presumably because of influence by fusion to the inner layer.

With respect to a sample cut out of the outer layer of each composite roll, the area ratio of troostite (%) in the outer layer was measured at the initial diameter position, and with intervals of 5 mm in a depth range of 30-50 mm. The area ratio of troostite at the initial diameter is called surface T, and the maximum area ratio of troostite in a depth range of 30-50 mm is called deep portion T. The results are shown in Table 2.

TABLE 2

| No.(1) | Shore Hardness (Hs) of Outer Layer | | | | Area Ratio of Troostite (%) | |
|---|---|---|---|---|---|---|
| | Surface Hardness Ha | Deep-Portion Hardness Hb(2) | Hb − Ha | Inclination A(3) | Surface T | Deep Portion T |
| Example 1 | 77 | 80 | 3 | 0.054 | 2.3 | 0.5 |
| Example 2 | 72 | 77 | 5 | 0.160 | 2.5 | 0.6 |
| Example 3 | 74 | 76 | 2 | 0.025 | 5.2 | 0.3 |
| Example 4 | 75 | 77 | 2 | 0.035 | 1.2 | 0.1 |
| Example 5 | 78 | 79 | 1 | 0.018 | 7.8 | 2.9 |
| Example 6 | 79 | 83 | 4 | 0.131 | 0.0 | 0.0 |
| Example 7 | 68 | 74 | 6 | 0.150 | 2.5 | 0.0 |
| Com. Ex. 1 | 74 | 70 | −4 | −0.132 | 0.2 | 4.5 |
| Com. Ex. 2 | 83 | 82 | −1 | −0.020 | 0.0 | 0.3 |
| Com. Ex. 3 | 65 | 67 | 2 | 0.021 | 12.6 | 4.9 |

Note:
(1)"Com. Ex." means Comparative Example.
(2)The maximum Shore hardness of the outer layer in a depth range of 30-50 mm.
(3)The inclination (Hs/mm) of the regression line of the depth-direction Shore hardness distribution in a range from the initial diameter of the outer layer to the depth of 30 mm.

Each composite roll of Examples 1-7 and Comparative Example 1 was subjected to a tempering treatment at 530° C. for 10 hours 2 times without heating to a temperature equal to or higher than the transformation point of the outer layer (without a hardening treatment). The composite roll of Comparative Example 2 was subjected to a hardening treatment comprising heating to 1050° C. and leaving it to cool, and then to a tempering treatment at 530° C. 2 times. A hardening treatment and a tempering treatment were not conducted to the cast composite roll of Comparative Example 3 (as-cast). Each composite roll of Examples 1-7 and Comparative Examples 1-3 was machined to an initial diameter of 810 mm. The discard diameter was set to 710 mm (effective thickness of the outer layer: 50 mm).

As is clear from Table 2, the deep-portion hardness was higher than the surface hardness by 1 or more in the composite rolls of Examples 1-7. In the composite roll of Comparative Example 1, however, the deep-portion hardness Hb was lower than the surface hardness Ha, because the Ni content in the outer layer was outside the range of the present invention. In the composite roll of Comparative Example 2, the surface hardness Ha was as high as 83, but the deep-portion hardness Hb was lower than the surface hardness Ha, because a hardening treatment of leaving it to cool from 1050° C. was conducted before the tempering treatment. In the composite roll of Comparative Example 3, the deep-portion hardness Hb was lower than the surface hardness Ha, because neither a hardening treatment nor a tempering treatment were conducted after casting (as-cast).

With the outer diameter decreasing by damages-removing cutting, the composite rolls of Examples 1-7 are suitable for the first stand in a range that the outer diameter is from 810 mm (initial diameter) to 780 mm, suitable for the second stand in a range from more than 780 mm to 750 mm, and suitable for the third stand in a range from more than 750 mm to 710 mm.

Examples 8 and 9, and Comparative Example 4

A melt for the outer layer having the composition shown in Table 3 was cast to the thickness of 96.5 mm into the same centrifugal casting mold as in Example 1 at a casting temperature shown in Table 4. After the solidification of the outer layer, a stationary casting mold was constructed in the same manner as in Example 1, and a ductile-cast-iron melt having the same composition as in Example 1 was cast at 1431° C. into a cavity of the stationary casting mold. An inner surface layer of the outer layer was re-molten, and integrally fused to the inner layer. After each of the resultant composite rolls was cooled such that the surface temperature of the outer layer became 600° C. or lower, the mold was disassembled.

TABLE 3

| No.[1] | Composition (% by mass) | | | | | | |
|---|---|---|---|---|---|---|---|
| | C | Si | Mn | Cr | Ni | Mo | W |
| Example 8 | 2.14 | 0.29 | 0.24 | 4.76 | 1.91 | 8.76 | — |
| Example 9 | 2.14 | 0.94 | 0.52 | 3.92 | 1.81 | 5.42 | 1.64 |
| Com. Ex. 4 | 2.10 | 0.31 | 0.25 | 4.65 | 1.05 | 8.84 | — |

| No.[1] | Composition (% by mass) | | | | | |
|---|---|---|---|---|---|---|
| | V | Nb | Co | Ti | Zr | N | Fe |
| Example 8 | 6.51 | — | — | 0.18 | — | 0.04 | Bal. |
| Example 9 | 6.31 | 0.48 | 6.01 | 1.42 | 0.42 | 0.06 | Bal. |
| Com. Ex. 4 | 6.55 | — | 0.62 | 0.20 | — | 0.04 | Bal. |

Note:
[1]"Com. Ex." means Comparative Example.

The composite rolls of Examples 8 and 9 were subjected to a tempering treatment at 510° C. for 10 hours 2 times without heating to a temperature equal to or higher than the transformation point of the outer layer (without a hardening treatment). The composite roll of Comparative Example 4 was cooled, annealed at 880° C., and subjected to a hardening treatment comprising heating to 1000° C. and leaving it to cool, and then a tempering treatment at 510° C. for 10 hours 3 times. Each composite roll of Examples 8 and 9 and Comparative Example 4 was machined to the initial diameter of 810 mm. The discard diameter was set to 710 mm (effective thickness of the outer layer: 50 mm).

Table 4 shows the area ratio of undecomposed $M_2C$, and the area ratio of MC carbides and $M_6C$ carbides formed by the decomposition of $M_2C$ carbides at the initial diameter and the discard diameter of the outer layer of each composite roll. The undecomposed $M_2C$ carbides and the MC and $M_6C$ carbides formed by the decomposition of $M_2C$ were classified by their forms as shown in the metal structure of FIGS. 3 and 4, and their area ratios were determined by image analysis software.

Figure 3A:
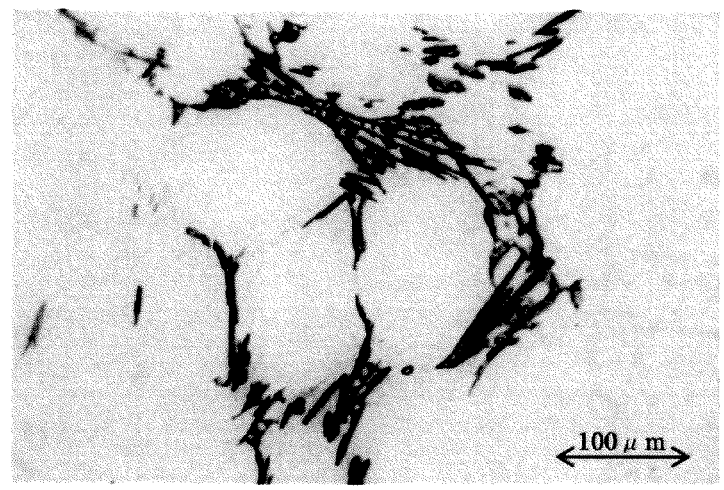
FIG. 3(a) is a photomicrograph (magnification: 400 times) showing the metal structure of the outer layer at the initial diameter in the composite roll of Example 8.
Figure 3B:
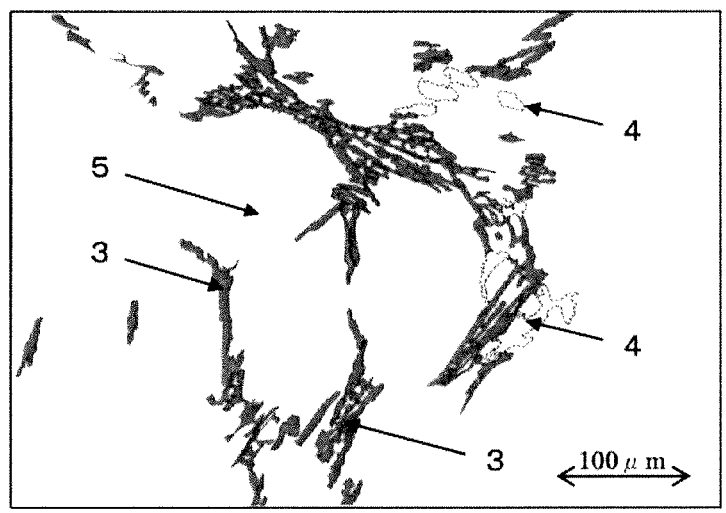
FIG. 3(b) is a view schematically showing the distribution of carbides in the metal structure shown in FIG. 3(a).
Figure 4A:
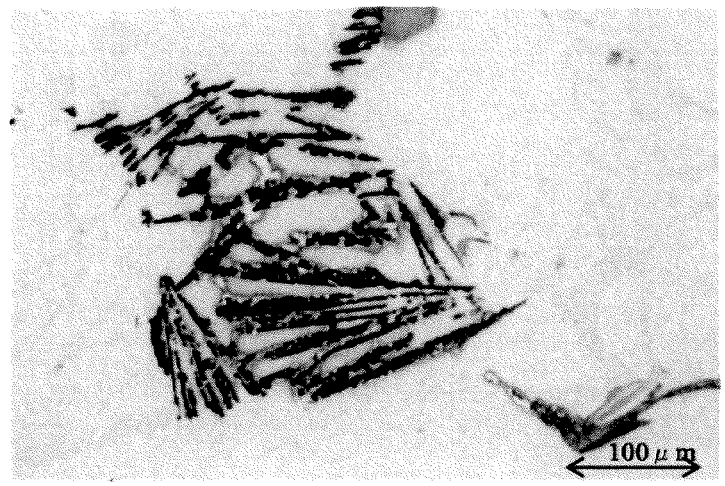
FIG. 4(a) is a photomicrograph (magnification: 400 times) showing the metal structure of the outer layer at the discard diameter in the composite roll of Example 8.
Figure 4B:
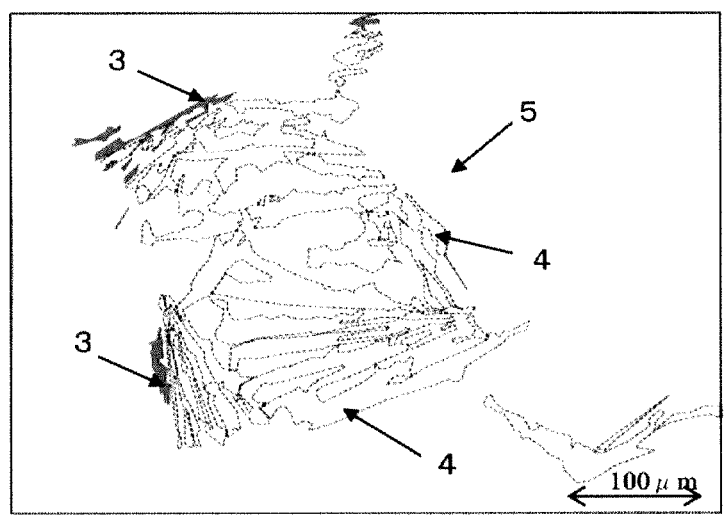
FIG. 4(b) is a view schematically showing the distribution of carbides in the metal structure shown in FIG. 4(a).

FIG. 3(a) is a photomicrograph (magnification 400 times) showing the metal structure of the outer layer at the initial diameter in the composite roll of Example 8, and FIG. 3(b) schematically shows the distribution of carbides in the metal structure shown in FIG. 3(a). FIG. 4(a) is a photomicrograph (magnification 400 times) showing the metal structure of the outer layer at the discard diameter in the composite roll of Example 8, and FIG. 4(b) schematically shows the distribution of carbides in the metal structure shown in FIG. 4(a). In FIGS. 3 and 4, 3 represents undecomposed planar $M_2C$ carbides, 4 represents MC carbides and $M_6C$ carbides formed by the decomposition of $M_2C$ carbides, and 5 represents a matrix.

TABLE 4

| No.[1] | Casting Temperature (° C.) | Area Ratio of Carbides (%) | | | |
|---|---|---|---|---|---|
| | | At Initial Diameter | | At Discard Diameter | |
| | | $M_2C$[2] | MC, $M_6C$[3] | $M_2C$[2] | MC, $M_6C$[3] |
| Example 8 | 1382 | 5.7 | 1.9 | 3.4 | 6.3 |
| Example 9 | 1390 | 1.5 | 0.7 | 0.7 | 2.1 |
| Com. Ex. 4 | 1397 | 0.6 | 6.5 | 1.4 | 7.8 |

Note:
[1]"Com. Ex." means Comparative Example.
[2]Undecomposed $M_2C$.
[3]MC carbides and $M_6C$ carbides formed by the decomposition of $M_2C$ carbides.

With respect to the outer layer, the surface hardness Ha, the deep-portion hardness Hb, their difference (Hb−Ha), the hardness inclination A to the deep portion, and the area ratios of troostite in the surface layer and the deep portion were measured in the same manner as in Example 1. The results are shown in Table 5. The deep-portion hardness Hb was higher than the surface hardness Ha in Examples 8 and 9, while the surface hardness Ha was higher than the deep-portion hardness Hb in Comparative Example 4.

TABLE 5

| No.[1] | Shore Hardness (Hs) of Outer Layer | | | | Area Ratio of Troostite (%) | |
|---|---|---|---|---|---|---|
| | Surface Hardness Ha | Deep-Portion Hardness Hb[2] | Hb − Ha | Inclination A[3] | Surface T | Deep Portion T |
| Example 8 | 73 | 79 | 6 | 0.147 | 2.3 | 0.2 |
| Example 9 | 72 | 77 | 5 | 0.122 | 3.7 | 0.4 |
| Com. Ex. 4 | 79 | 74 | −5 | −0.130 | 0.0 | 0.7 |

Note:
[1]"Com. Ex." means Comparative Example.
[2]The maximum Shore hardness of the outer layer at a depth of 30-50 mm.
[3]The inclination (Hs/mm) of the regression line of the depth-direction Shore hardness distribution in a range from the initial diameter of the outer layer to the depth of 30 mm.

EFFECTS OF THE INVENTION

Because the outer layer has Shore hardness of 67-82 at the initial diameter, with the maximum Shore hardness of the outer layer in a range 30 mm or more deep from the initial diameter being higher than the Shore hardness of the outer layer at the initial diameter by 1 or more, in the centrifugally cast composite roll for hot rolling according to the present invention, a surface layer of the outer layer having a large effective diameter close to the initial diameter has high heat-cracking resistance, while a deep portion of the outer layer having a small effective diameter close to the discard diameter is smooth and has high wear resistance. Accordingly, when the composite roll of the present invention has a large effective diameter, it can utilize high heat-cracking resistance in upstream stands in a finishing mill in a hot strip mill, with strong resistance to scratching by folding and oxide scales. When the effective diameter is reduced by damages-removing cutting, the composite roll of the present invention can utilize high wear resistance in downstream stands, with a smooth roll surface.

Though the centrifugally cast composite roll for hot rolling according to the present invention is suitable for work rolls in a hot strip mill used under severe rolling conditions, it can also be used, of course, as a roll for hot-rolling wires, shaped rods, etc.

What is claimed is:

1. A centrifugally cast composite roll for hot rolling comprising an outer layer having a composition comprising by mass 0.8-3.5% of C, 0.1-2.5% of Si, 0.1-2.5% of Mn, 1.2-15% of Cr, 1-5% of Ni, and 2.53-10% of Mo+0.5×W, the balance being substantially Fe and inevitable impurities, and an inner layer made of an iron-based alloy and integrally fused to said outer layer; said outer layer having Shore hardness of 67-82 at an initial diameter of said composite roll, the initial diameter being an outer diameter of the composite roll before the composite roll is used for rolling; and the maximum Shore hardness of said outer layer in a range 30 mm or more deep from said initial diameter being higher by 1 or more than the Shore hardness of said outer layer at said initial diameter.

2. The centrifugally cast composite roll for hot rolling according to claim 1, wherein a regression line of the depth-direction distribution of the Shore hardness of said outer layer in a range up to the depth of 30 mm from said initial diameter has positive inclination A (Hs/mm).

3. The centrifugally cast composite roll for hot rolling according to claim 1, wherein said outer layer further comprises 2-15% by mass of V+Nb.

4. The centrifugally cast composite roll for hot rolling according to claim 1, wherein said outer layer further comprises at least one of 1-10% of Co, 0.01-2% of Ti, 0.01-2% of Zr, and 0.001-0.15% of N by mass.

5. The centrifugally cast composite roll for hot rolling according to claim 1, wherein said outer layer has a W content of 0.1-20% by mass.

6. The centrifugally cast composite roll for hot rolling according to claim 1, wherein said inner layer is made of ductile cast iron.

7. The centrifugally cast composite roll for hot rolling according to claim 1, which comprises an intermediate layer between said outer layer and said inner layer.

8. The centrifugally cast composite roll for hot rolling according to claim 3, wherein an area ratio of undecomposed $M_2C$ carbides is more than an area ratio of MC carbides and $M_6C$ carbides formed by the decomposition of $M_2C$ carbides at said initial diameter of said outer layer, and the area ratio of undecomposed $M_2C$ carbides is less than the area ratio of MC carbides and $M_6C$ carbides formed by the decomposition of $M_2C$ carbides at the discard diameter of said outer layer.

9. The centrifugally cast composite roll for hot rolling according to claim 8, wherein a ratio of (area ratio of undecomposed $M_2C$ carbides)/[(area ratio of undecomposed $M_2C$ carbides)+(area ratio of MC carbides and $M_6C$ carbides formed by the decomposition of $M_2C$ carbides)] is 60% or more at the initial diameter.

10. The centrifugally cast composite roll for hot rolling according to claim 8, wherein a ratio of (area ratio of MC carbides and $M_6C$ carbides formed by the decomposition of $M_2C$ carbides)/[(area ratio of undecomposed $M_2C$ carbides)+(area ratio of MC carbides and $M_6C$ carbides formed by the decomposition of $M_2C$ carbides)] is 60% or more at the discard diameter.

11. The centrifugally cast composite roll for hot rolling according to claim 1, wherein a cross section area ratio of the outer layer to the inner layer is 0.25-0.8 at the initial diameter.

12. A method for producing the centrifugally cast composite roll for hot rolling recited in claim 1, comprising the steps of casting a melt for the outer layer into a rotating centrifugal casting mold; casting an iron-based alloy melt for the inner layer into the resultant hollow outer layer during or after the solidification of said outer layer, such that said inner layer is integrally fused to an inner surface of the outer layer by re-melting; cooling the resultant composite roll until the surface temperature of said outer layer becomes 600° C. or lower; and then conducting a tempering treatment at 600° C. or lower one or more times without a heating step to a temperature equal to or higher than the transformation point of the outer layer.

13. The method for producing a centrifugally cast composite roll for hot rolling according to claim 12, wherein said centrifugal casting mold has a wall as thick as 100-600 mm.

* * * * *